(12) United States Patent
Montieth

(10) Patent No.: US 11,867,151 B2
(45) Date of Patent: Jan. 9, 2024

(54) FLUID TURBINE ROTOR BLADE

(71) Applicant: Robert Lothar Montieth, Bridgewater, MA (US)

(72) Inventor: Robert Lothar Montieth, Bridgewater, MA (US)

(*) Notice: Subject to any disclaimer, the term of this patent is extended or adjusted under 35 U.S.C. 154(b) by 0 days.

(21) Appl. No.: 18/160,768

(22) Filed: Jan. 27, 2023

(65) Prior Publication Data

US 2023/0175480 A1  Jun. 8, 2023

Related U.S. Application Data

(63) Continuation-in-part of application No. 17/301,750, filed on Apr. 13, 2021, now abandoned.

(51) Int. Cl.
*F03D 3/06* (2006.01)
*F03D 3/00* (2006.01)

(52) U.S. Cl.
CPC .......... *F03D 3/061* (2013.01); *F03D 3/005* (2013.01); *F03D 3/062* (2013.01); *F05B 2240/212* (2013.01); *F05B 2240/213* (2013.01)

(58) Field of Classification Search
CPC .......... F03D 3/065; F03D 3/061; F03D 3/005; F05B 2240/212; F05B 2240/213; F05B 2240/211–218
See application file for complete search history.

(56) References Cited

U.S. PATENT DOCUMENTS

| | | | | |
|---|---|---|---|---|
| 3,942,909 A | * | 3/1976 | Yengst | F03D 7/06 416/139 |
| 7,896,608 B2 | * | 3/2011 | Whitworth | F03D 3/0436 415/4.2 |
| 8,210,817 B2 | * | 7/2012 | Iskrenovic | F03D 13/20 416/197 A |
| 9,140,236 B2 | * | 9/2015 | Iskrenovic | F03D 3/067 |
| 9,482,204 B2 | * | 11/2016 | Plourde | F03D 3/061 |
| 2007/0269312 A1 | * | 11/2007 | Hsu | F03D 3/062 416/186 R |
| 2008/0106102 A1 | * | 5/2008 | Liao | F03D 3/02 290/55 |
| 2021/0348592 A1 | * | 11/2021 | Kyllonen | F03D 3/005 |
| 2022/0403817 A1 | * | 12/2022 | Muric | F03D 3/0418 |

* cited by examiner

*Primary Examiner* — Justin D Seabe
*Assistant Examiner* — Behnoush Haghighian

(57) ABSTRACT

A fluid turbine has semi-spherical, hollow blades arrayed about a vertical axis. The turbine's blade shape reduces drag on a convex side and increases drag on a concave side. Part of the center of the array of rotor blades is open, allowing flow through the center of the array. The spherical form enhances fluid flow through the center of the array and results in rotational force on a downwind blade, and directs fresh air into bypass flow. A combination of holes and a deflector surface generates vortices as updraft flow passes through holes, creating a pressure differential between the area surrounding the holes and the upper portions of the blade. Fluid passing from relatively higher pressure to relatively lower pressure passes the deflector surface, forming vortices that result in rotational force on the blades of the fluid turbine.

3 Claims, 10 Drawing Sheets
(4 of 10 Drawing Sheet(s) Filed in Color)

FLUID TURBINE ROTOR BLADE

TECHNICAL FIELD

The present disclosure relates to fluid turbines. Classifications might include "F03D3/0427, Wind motors with rotation axis substantially perpendicular to the air flow entering the rotor having stationary wind-guiding means, e.g. with shrouds or channels with augmenting action, i.e. the guiding means intercepting an area greater than the effective rotor area;" "G08G5/0095, Aspects of air-traffic control not provided for in the other subgroups of this group."

BACKGROUND

In general, vertical-axis fluid turbines comprise arrays of vertical rotor blades arranged evenly about a central, vertical axis and coupled to an electrical generation machine. A Savonius turbine is commonly referred to as a drag-driven turbine. In this type of wind turbine, Some of the stream volume encounters a rotor blade on the downwind side of the vertical axis and some of the stream volume encounters a blade on the upwind side. The rotor blade shape reduces drag as the rotor moves against the wind on the upwind side of the rotor. When moving with the wind on the downwind side of the rotor, the shape of the rotor increases drag.

A datum plane is an imaginary surface from which measurements or locations are measured. Some examples of this embodiment refer to a non-planar surface as a datum surface. A datum sphere is an imaginary spherical surface connoting a measurement or location of objects in space that lie on the surface of a sphere.

Fluid turbines generate electricity from a fluid stream. One skilled in the art understands that both air and water are fluids. The aerodynamic principles that govern a wind turbine may function as hydrodynamic principles in a water turbine. In this disclosure, terms such as "wind" "fluid" and "stream" may be used interchangeably.

Generally, a fluid turbine captures energy from a fluid stream. As fluid flows from the upstream side of the rotor to the downstream side, the average axial fluid velocity remains constant as the flow passes through the rotor. Energy is extracted at the rotor, resulting in a pressure drop on the downstream side. The fluid directly downstream of the rotor is at sub-atmospheric pressure due to the energy extraction. The fluid directly upstream of the rotor is at greater-than-atmospheric pressure. The high pressure upstream of the rotor deflects some of the upstream air around the rotor, diverting a portion of the fluid stream around the open rotor as if by an impediment. As the fluid stream is diverted around the open rotor, it expands. This is referred to as flow expansion at the rotor.

According to Betz's Law, a maximum 59% of the total energy in a column of wind may be extracted by an open-rotor turbine. As a wind turbine extracts energy from a column of wind, the wind in the wake of the rotor plane slows down, creating relatively lower air pressure and lower energy flow in the wake. The low-pressure, low-energy air impedes the column of wind in its approach. As a result, some of the wind flows around the rotor blades. This is known as bypass flow. Bypass flow contains energy that cannot be captured by the turbine. The more energy extracted by a wind turbine, the more impediment is encountered. This, in general, is the reason only 59% of wind energy can be captured.

A fluid-turbine power coefficient is the power generated divided by the ideal power available by extracting all the wind's kinetic energy approaching the rotor area. It is commonly known that rotor wake affects rotor intake. A volume of fluid encounters a rotor as an impediment in part because a portion of the fluid flowing around the rotor expands in the wake of the rotor in a form referred to as stream volume.

Bypass flow passes over the outer surface of the stream volume. The amount of energy extracted from the stream volume creates slower-moving flow in the rotor wake, impeding flow through the rotor. This impediment increases the volume of the rotor wake. As more power is extracted at a rotor, the rotor stream volume will expand and more fluid flow will bypass the rotor. If a significant amount of energy is extracted, most of the fluid flow will bypass the rotor and the rotor can effectively stop extracting energy, a condition known as rotor stall. Thus maximum power is achieved from the two opposing effects: that of increased power extraction resulting in relatively lower flow rates, and that of reduced power extraction resulting in relatively higher flow rates. Greater efficiency can be achieved by increasing the speed of a rotor wake. Wake-flow velocity may be increased by injecting higher velocity fluid streams into the wake flow, thus allowing for increased power extraction at the rotor and providing a relatively greater coefficient of power.

Turbines, particularly those mounted on rooftops, may experience turbulent updrafts. Common turbines do not specifically capture updraft flow.

SUMMARY

In an example embodiment, a Savonius-type vertical-axis wind turbine has a plurality of revolute blades arranged on its vertical axis. The blades' outer surfaces form a substantially spherical shape. Each of the revolute rotor blades captures air flow like any vertical turbine: perpendicular to the axis of rotation. The rotor blades are concave on their inner side and convex on their outer side, and arcuate at top and bottom surfaces. The arcuate top and bottom surfaces together forming a substantially spherical shape. In other words, the arcuate top and bottom surfaces are coincident with a datum sphere. This shape enables increased drag on the concave, inner side and reduced drag on the convex, outer side. The shape of the blades enables airflow through the center of the array, which is open. The ratio of open space in the center of the turbine to that of the rotor blades is between 1:5 and 1:7. A flow path through the substantially spherically shaped turbine blades increases in volume as it approaches the center of the sphere and decreases as it exits the sphere. Air flowing through a concave side of a first blade, through the open center and out along the concave surface of a second blade is also flowing through the spherical form and is therefore compressed at the exit as the flow path decreases in size.

A portion of the stream volume encounters a rotor blade on the downwind side of the vertical axis, and a portion of the stream volume encounters a rotor blade on the transverse, upwind side of the vertical axis. On the downwind side of the vertical axis, the convex side of each rotor blade faces upwind. An open center on the vertical axis allows some wind to flow through the turbine. The exhaust wind, having encountered the concave side of a rotor blade at a position referred to as $\theta=0°$, continues through the center of the turbine and flows through a downwind blade, which is also referred to as a blade at position $\theta=90°$, increasing the rotational velocity of the blade about the turbine vertical axis. Some of the wind that flows through an upwind rotor blade, otherwise referred to as a blade at θ=270°, flows through the center of the turbine and continues out through the concave side of a blade at position θ=270°, and out into the wake of the turbine, thus reducing the pressure on the back side of the upwind rotor blade. Injection of relatively higher speed air behind a rotor, minimizes wake pressure, reinforces the motion and reduces the pressure differential between the ambient flow and the wake.

The blades' substantially spherical shape causes air to flow into each subsequent blade portion by directing the flow toward the hollow center of the blade array and into the concave portion of the adjacent blade, which is in a downwind position. The spherical shape formed by the arcuate top and bottom surfaces of each blade also serve to compress the exiting flow. This flow increases in velocity as it is compressed. The increased velocity allows more mass flow into the turbine, and helps dissipate the wake flow as it exits the turbine. Quicker wake-dissipation results in faster downstream air recovery to ambient pressure. A reduced wake allows the turbines to be arranged more closely together in columns in a turbine field, improving efficiency.

An array of holes in the arcuate bottom surface of each blade allow for the capture, and power extraction, from turbulent updrafts. This is of particular importance when turbines are mounted on rooftops. An array of holes in the lower portion each of the turbine blades allow for flow to enter the internal chamber of each blade relatively quicker than that of the common, horizontal, flow path. The array of holes diverts turbulent updraft flow towards the internal, concave, surface of each blade. A deflector creates a pressure differential between the area surrounding the holes and the blade inlet. The resultant low pressure zone at the tip of each blade sucks the surrounding air in and thus encourages the formation of a vortex which in turn results in a rotational force on each rotor blade.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION

Figure 1:
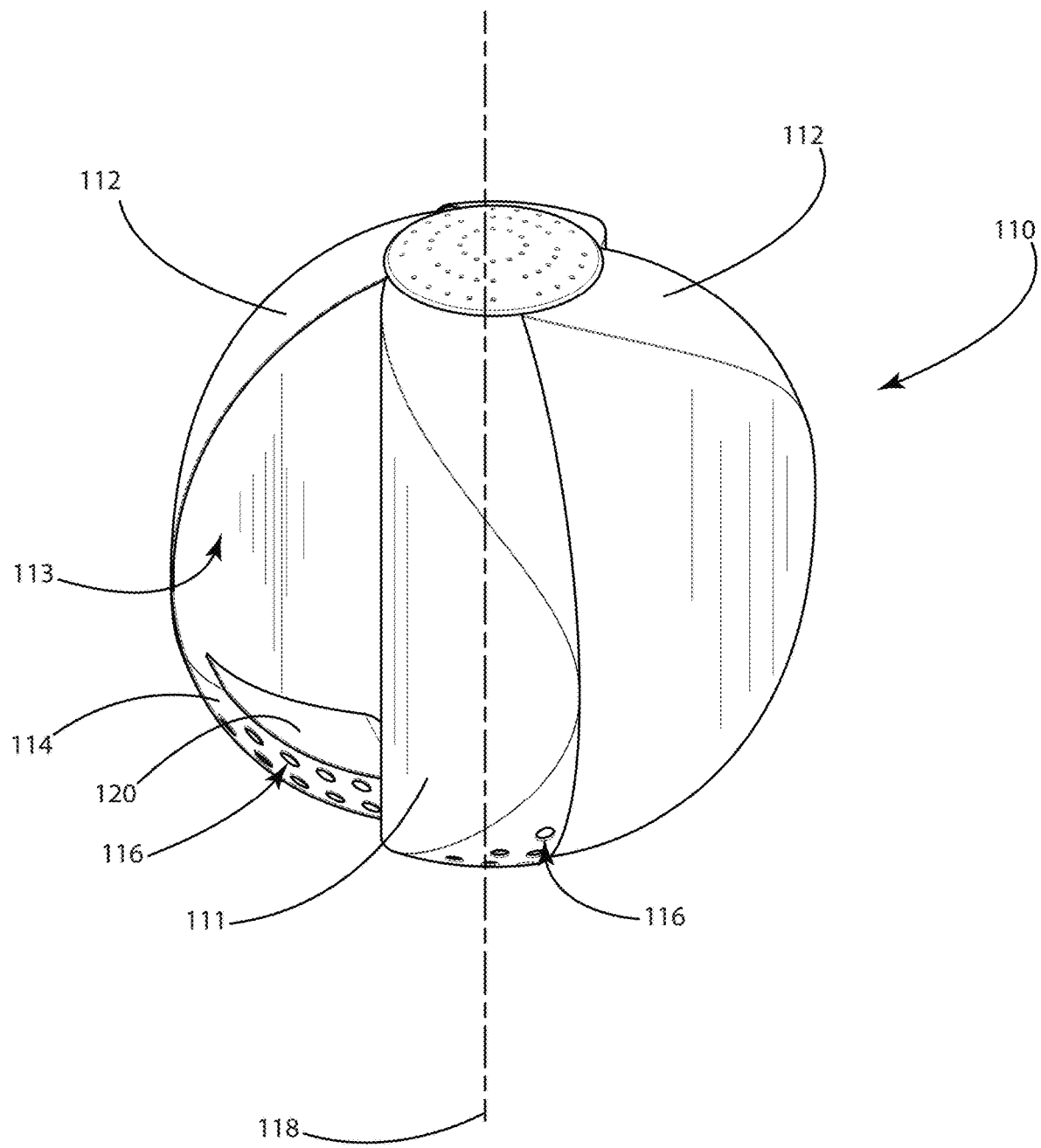
FIG. 1 is a front perspective view of an example embodiment.
Figure 2:
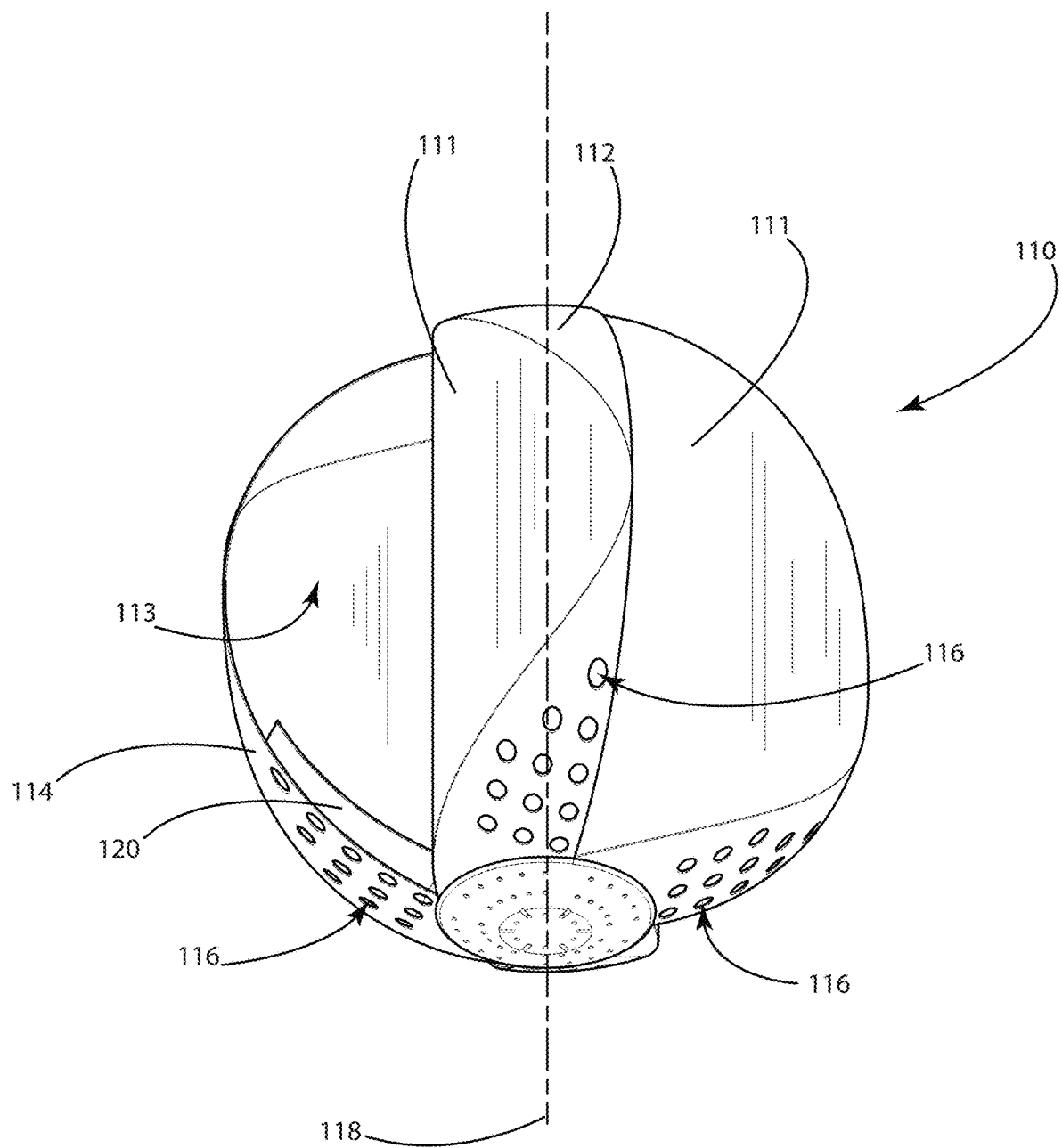
FIG. 2 is a bottom, perspective view of the embodiment thereof.
Figure 3:
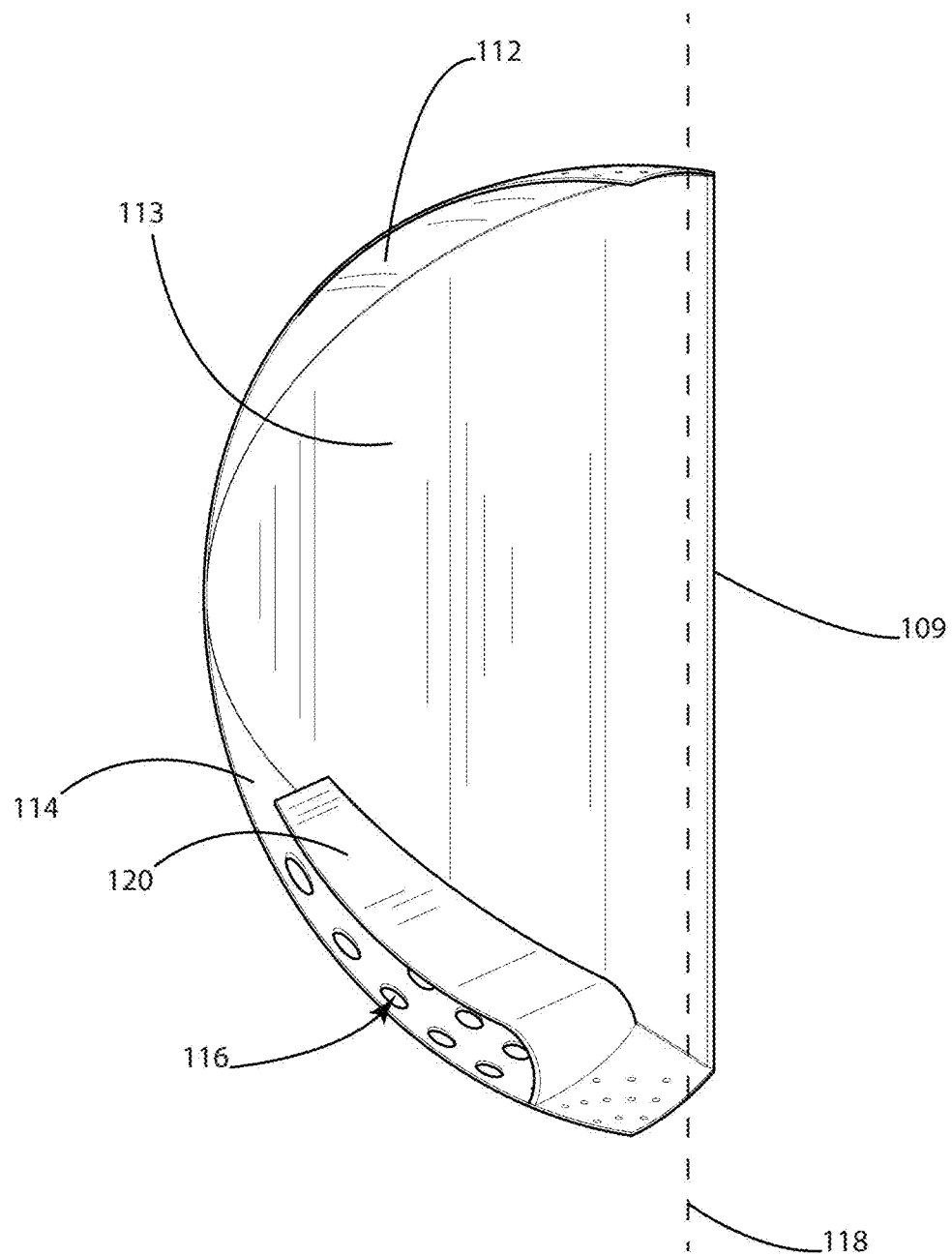
FIG. 3 is a perspective view of a rotor blade thereof

Referring to FIG. 1 FIG. 2 and FIG. 3, rotor blades 110 are arrayed about a central axis 118. The central axis may be said to reside vertically, in the center of a datum sphere. Each rotor blade's inner, longitudinally oriented surface is concave 113 and each longitudinally oriented, outer surface is convex 111. The concave inner surface 113 experiences increased drag in a fluid stream while the convex side 111 experiences relatively less drag. Latitudinally, each rotor blade has an upper surface 112 and a lower surface 114 which are both substantially perpendicular to the concave/convex surfaces 113/111. The upper surface 112 and lower surface 114 are coincident with a spherical datum surface and may be said to be formed from a segment of the datum sphere having an upper end 112 and a lower end 114. Each rotor blade lower surface 114 has an array of holes 116 proximal to a deflector surface 120. The combination holes 116 and deflector surface 120 divert fluid flow from turbulent updrafts, toward the concave inner surface 113 by creating a pressure differential between the holes and the rest of the blade inlet. The resultant low-pressure zone at the blade tip sucks surrounding flow in to encourage the formation of a vortex.

One skilled in the art understands that the rotor blades 110 may be connected to a shaft configured to turn a generator. The overall shape of the blades when assembled is that of a sphere. In an example embodiment, rotor blades are constructed of a fiber-reinforced polymer combined with a dye that appears fluorescent to birds and as monochromatic to humans.

Figure 4:
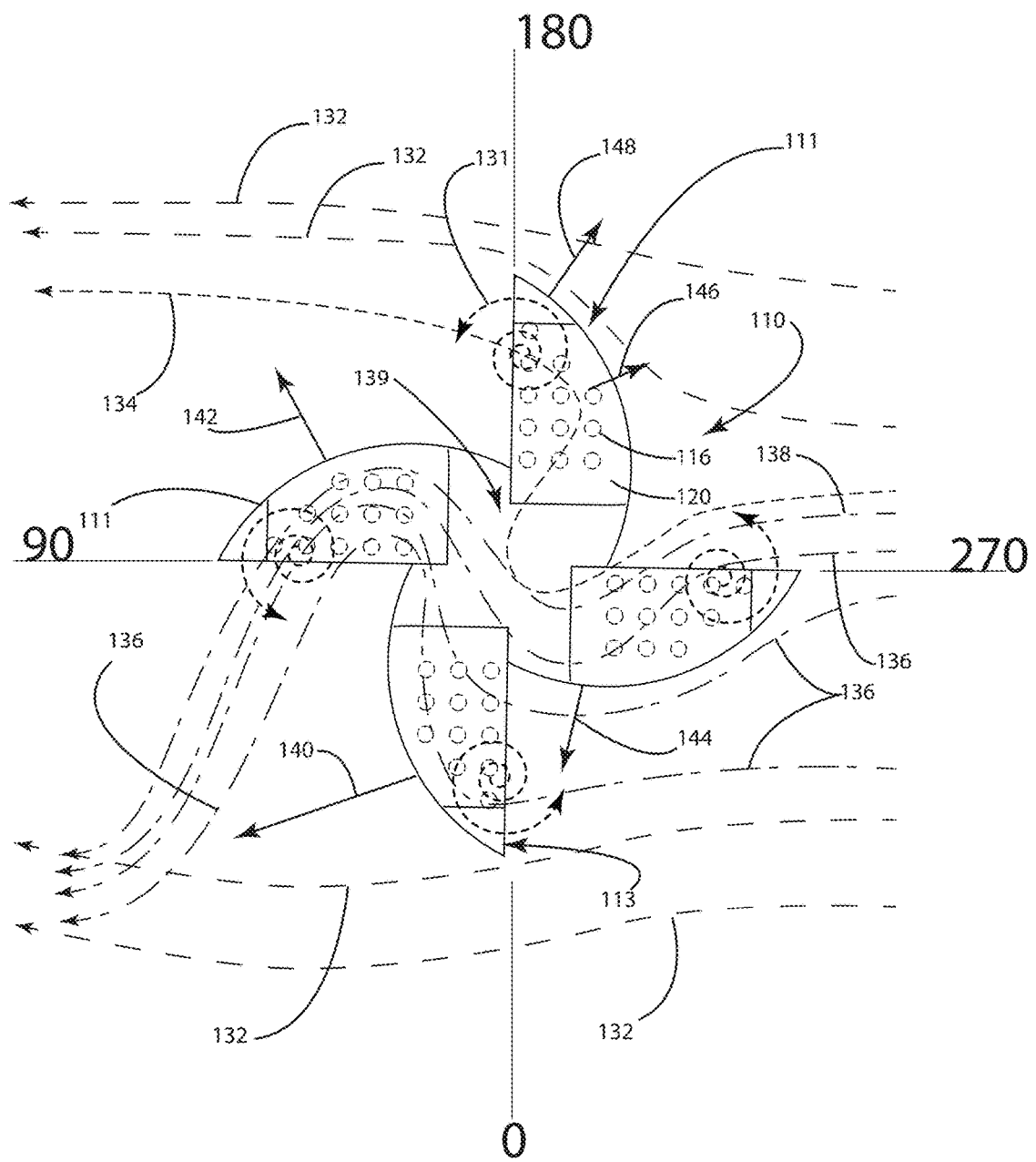
FIG. 4 is a top, cross section flow diagram of the embodiment thereof.

The illustration in FIG. 4 is a top, cross-section view depicting flow through the turbine 100. The example embodiment shows four rotor blades 110, each having a concave side 113 and a convex side 111. One blade is at θ=0°, one at θ=90°, one at θ=180°, and another at θ=270°, One skilled in the art understands that the convex side 111 exhibits less drag when facing the fluid stream than a concave side 113. The rotor blade at θ=180°, while the concave side 113 exhibits greater drag when facing the fluid stream, causing rotation of the blades. In this view the apparatus is rotating in a clockwise rotation. Vortices generated by the combination holes 116 and deflector surface 120 result in a vortex in the outer region of each blade thus increasing the rotational force on each blade. An array of holes 116 is shown on each blade in dashed line, or hidden line, as the holes are beneath deflectors 120 in the view in FIG. 4. Fluid flowing through holes 116 around deflectors 120 result in vortices 131 which result in force vector(s) 148 thus increasing the rotational force on the rotor assembly.

Figure 5:
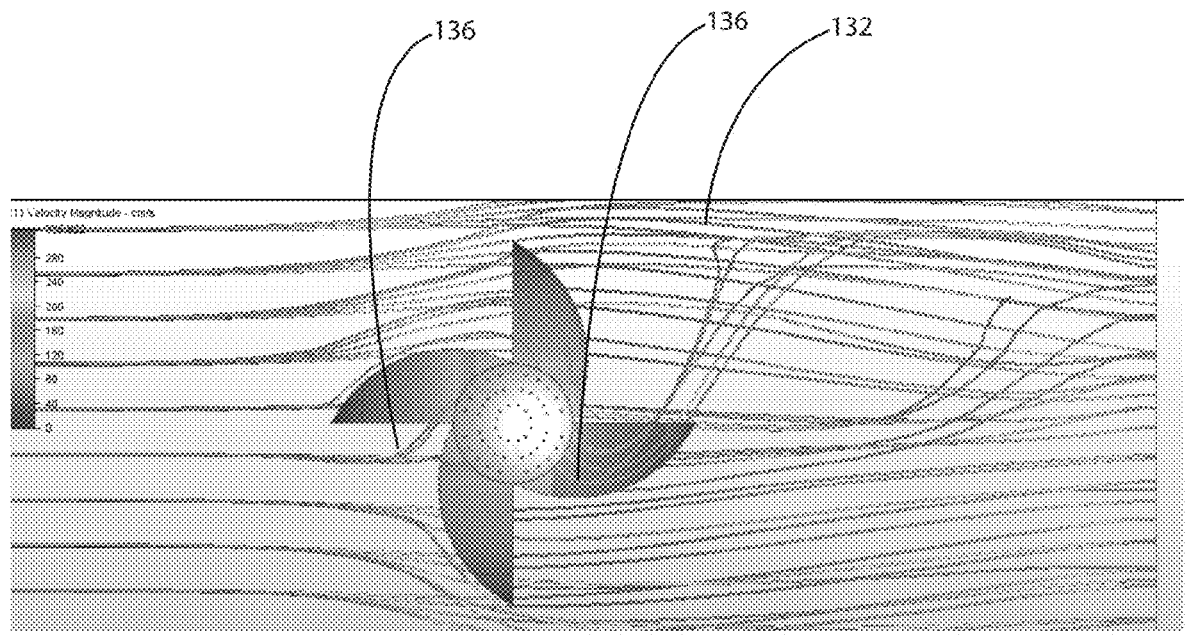
FIG. 5 is a color diagram of the flow diagram of FIG. 4.

FIGS. 4 and 5 show a fluid stream meeting the turbine as an impediment, causing some of the stream 132 to flow past the turbine. This is referred to as bypass flow 132. The primary means of energy extraction occurs when a portion of the fluid stream 136 flows into the concave side of a blade 113, at position forming the resultant force vector 140. Some of the fluid stream flowing into the concave side of the blades at positions θ=270°, and θ=0°, are depicted by lines 136. Another portion of the fluid stream flows into the concave side of a blade at position θ=270 is shown as fluid stream 138. In one example, a portion of the fluid stream 136 and another portion of the fluid stream 138 encounters the concave side of a rotor blade at θ=270°, initially interacting with the concave side of the blade at θ=270°, creating the resultant force vector 144. The fluid then flows through the center of the turbine to the concave side of a rotor blade at position θ=90°, creating the resultant force vector 142. Some of the fluid 138 passes through the open center 139 of the turbine and creates a resultant force vector 142. Other portions of the fluid stream 134 flow through the center and out an upstream blade at θ=180°, creating force vector 146 before exiting the turbine to mix with bypass flow 132.

Figure 6:
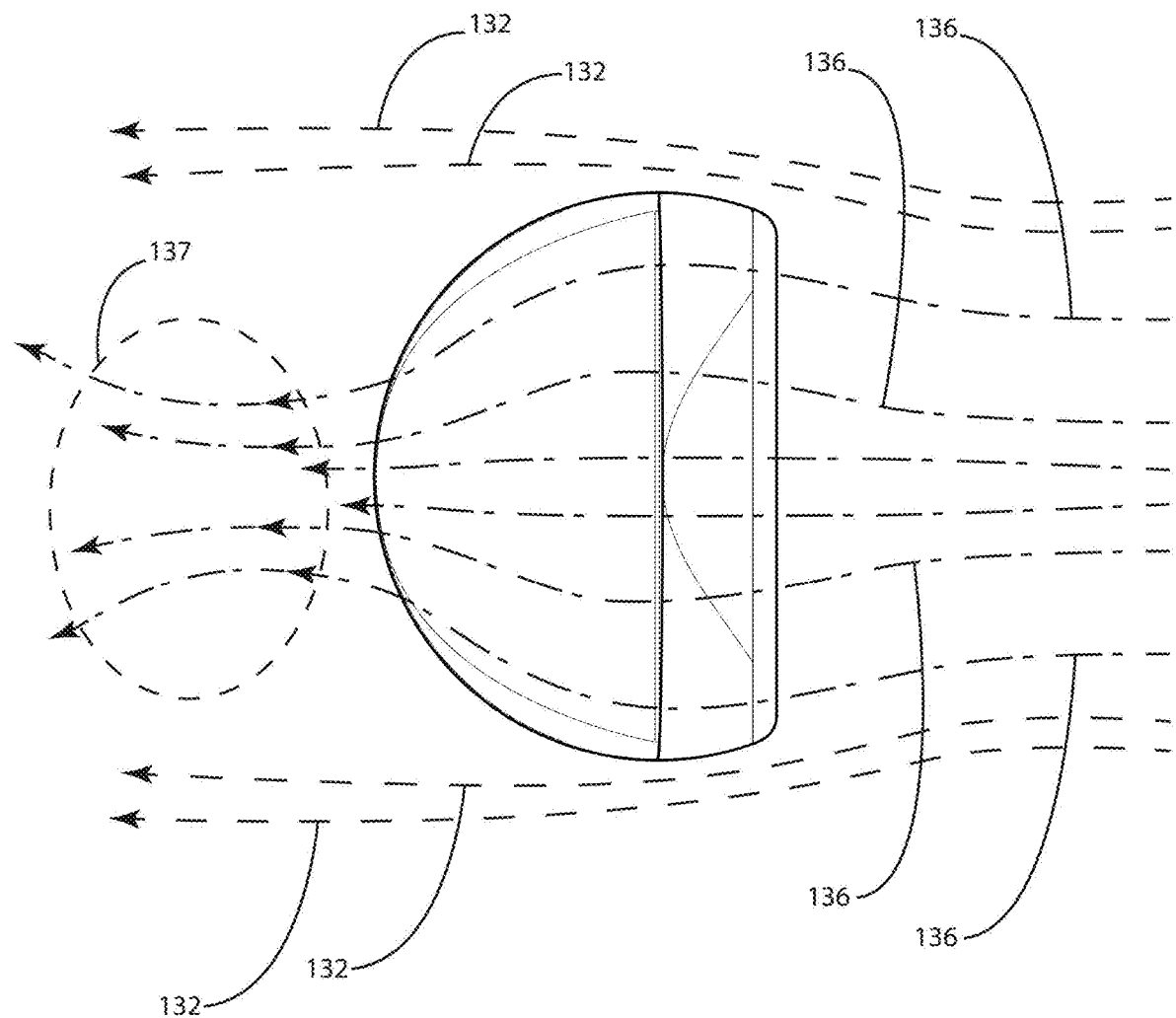
FIG. 6 is a cutaway perspective view thereof.

FIG. 6 is a flow diagram depicting a fluid stream moving through a vertical cross-section of the rotor blades. The spherical form of the rotor assembly guides the portion of the stream 136 through the open center of the rotor assembly. The portion of the fluid stream 136 is compressed as it passes through the turbine. Specifically, as it passes through the rotor assembly, some of the flow 136 becomes compressed, increasing in velocity. This compressed, higher-velocity fluid stream is depicted in dashed-line area 137. The higher velocity flow 137 then mixes with the relatively slower bypass flow 132 in the region of the turbine wake.

Figure 7:
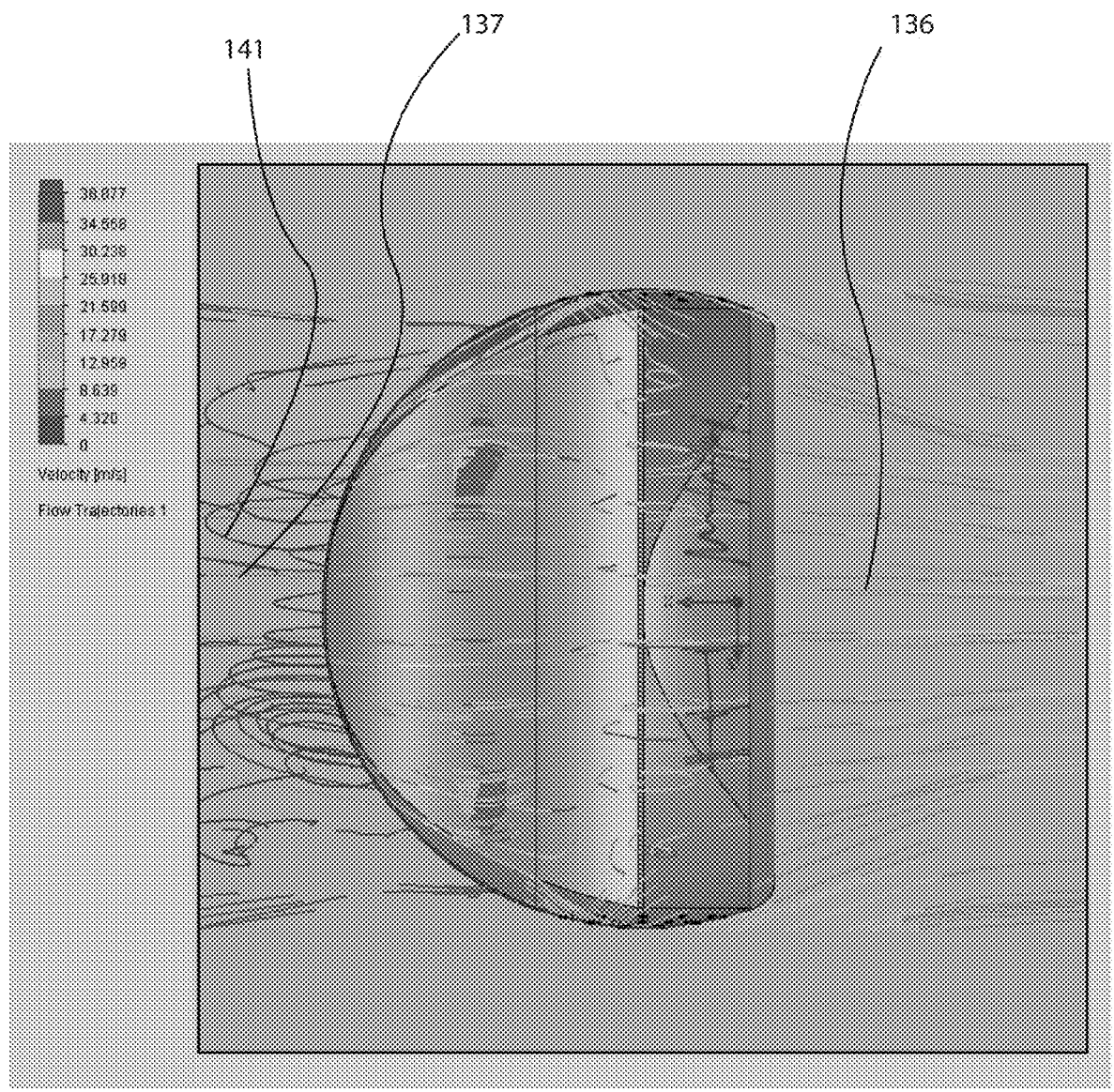
FIG. 7 is a side, cross section, flow diagram thereof.

FIG. 7 shows a computer fluid-dynamics image of some of the wake flow 137 traveling at a relatively higher velocity than the wake flow 141.

Figure 8:
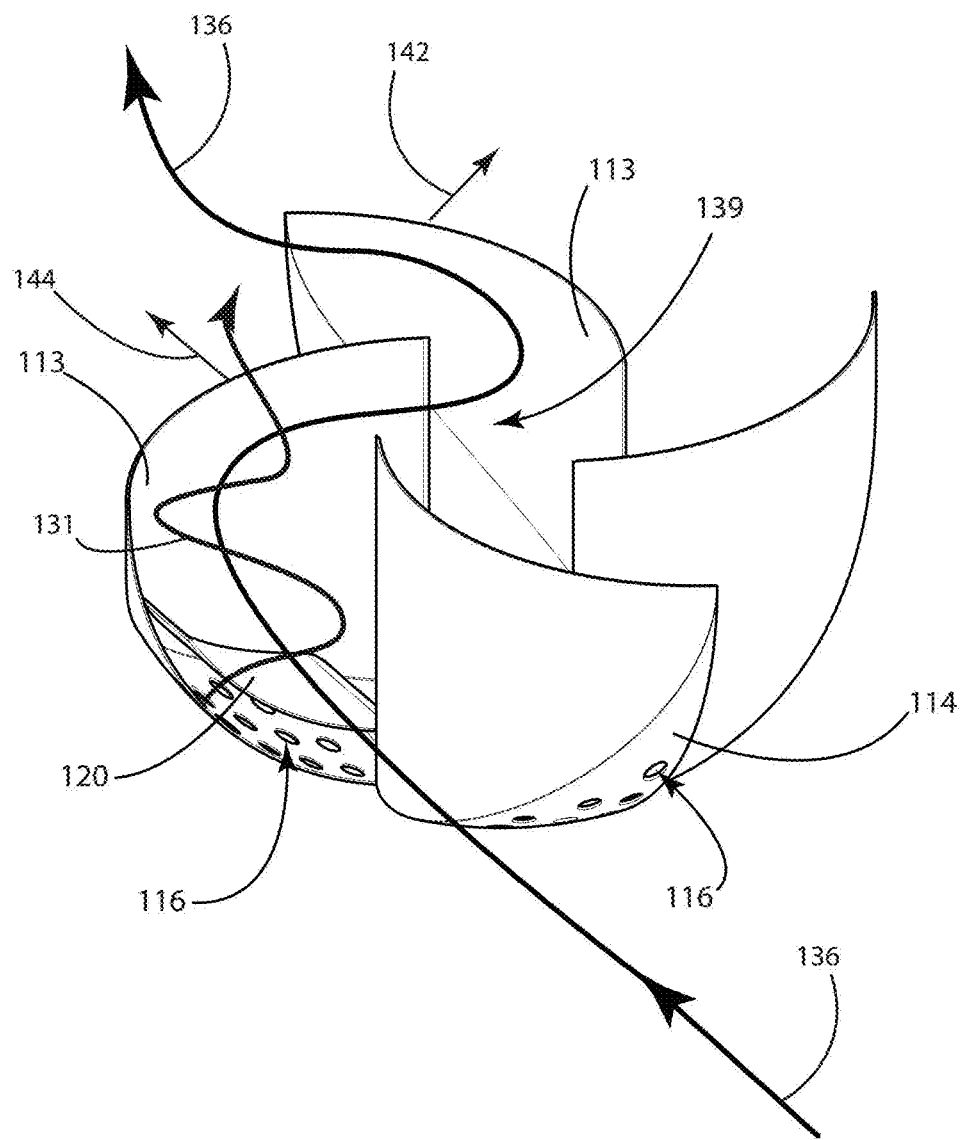
FIG. 8 is a computer fluid dynamic image of the embodiment.

FIG. 8 is a cutaway, perspective view showing the open center 139 and an example fluid stream line 136 creating force vectors 144 and 142 as it passes through the turbine, impacting concave surfaces 113. Vortices 131 generated by the combination of holes 116 and deflector surfaces 120 exert a force on the inner, concave surface of each rotor blade. One skilled in the art understands how the flow diagram of FIG. 4 applies to the perspective view of FIG. 8.

Figure 9:
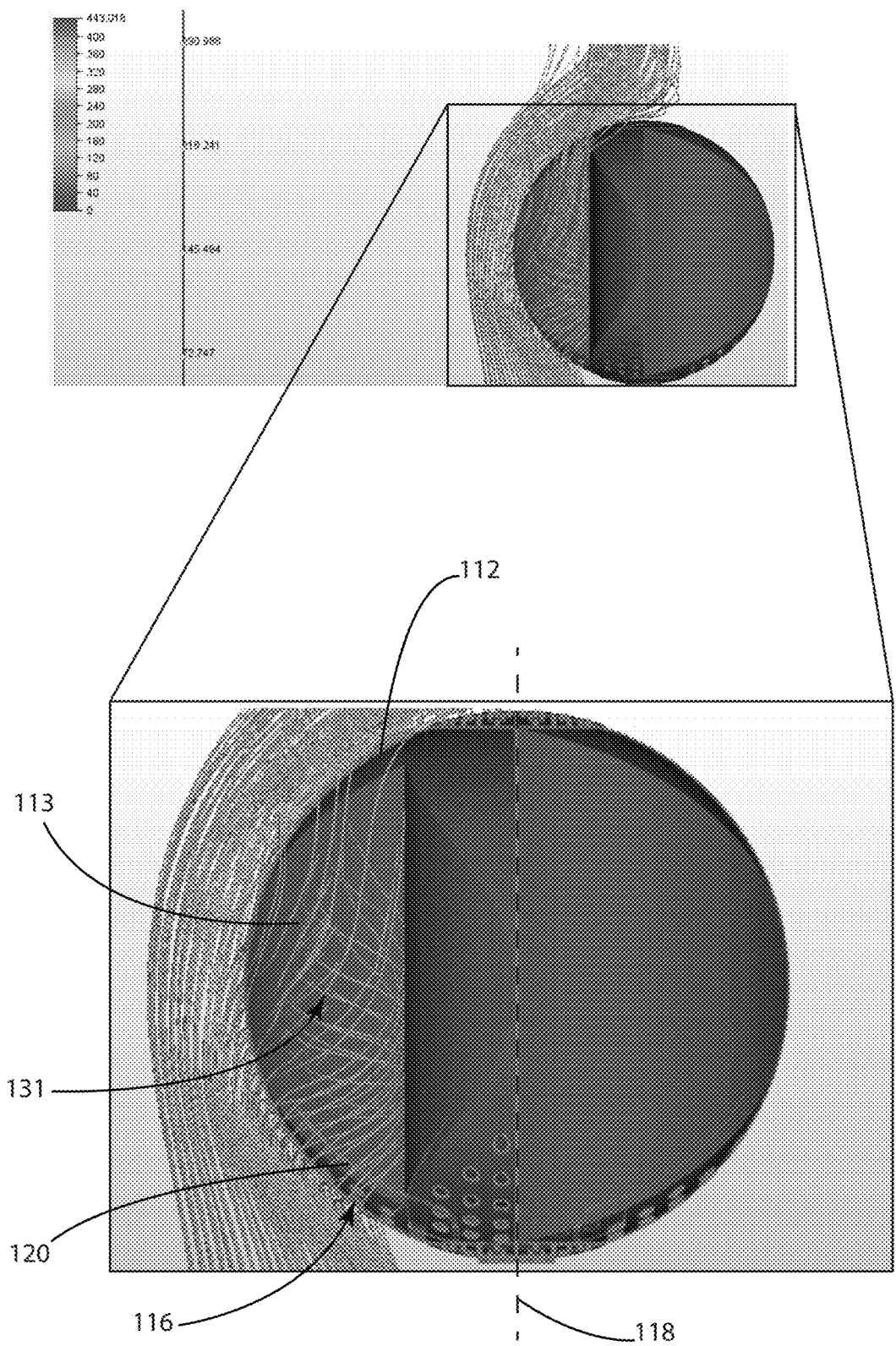
FIG. 9 is a detailed, computer fluid dynamic image thereof.
Figure 10:
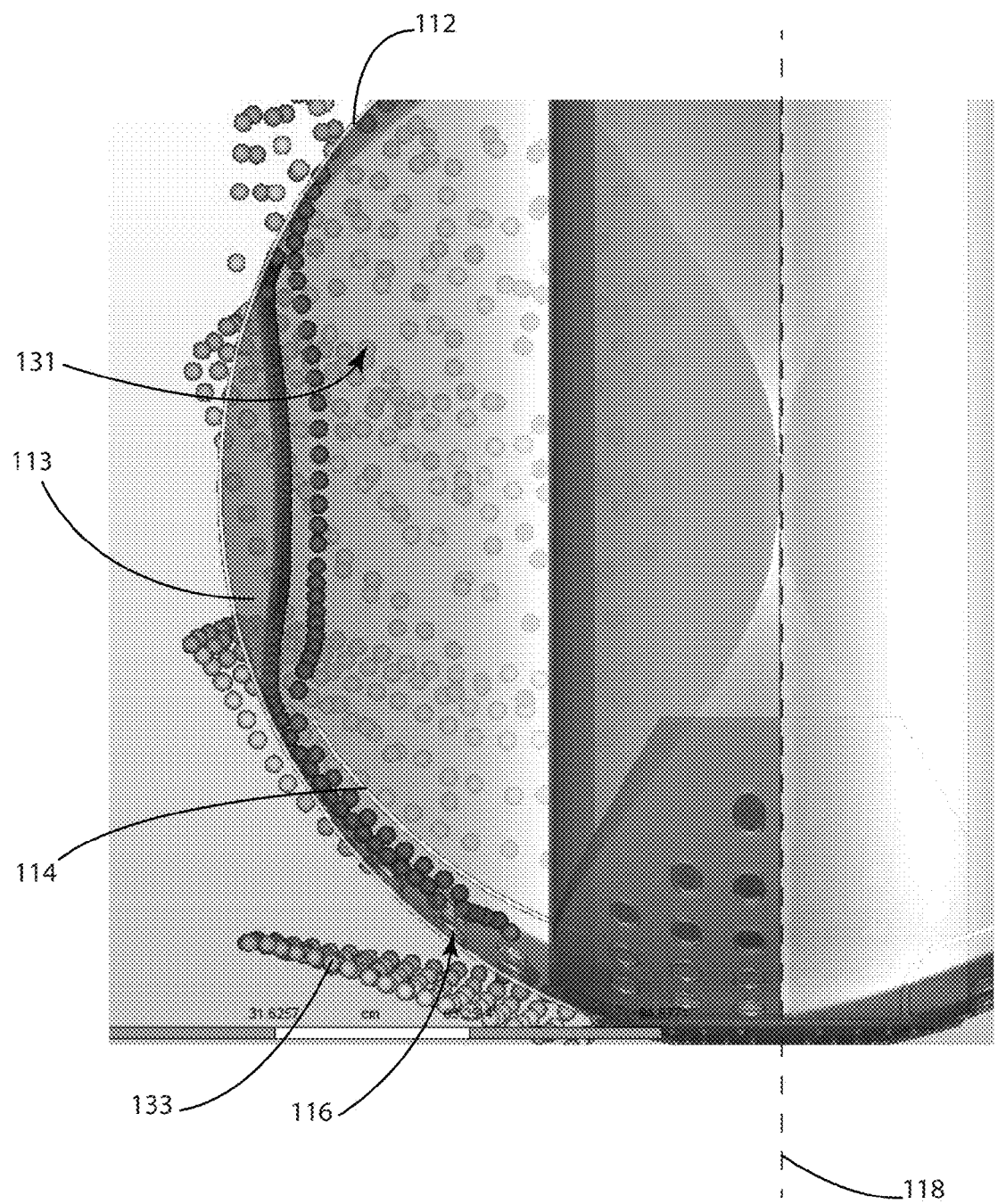
FIG. 10 is a detailed, computer fluid dynamic image thereof.

FIG. 9 and FIG. 10 illustrate the vortex created by the combination of holes 116 and deflector 120 that generates a force against the concave blade surface 113. The central axis 118 is shown for reference. A portion of updraft flow 133 (FIG. 10) passes through holes 116, is flows along the deflector surface 120 and enters the interior of the turbine blade as a vortex 131. A relatively higher pressure forms at the holes 116, beneath the deflector 120, than that of the rest of the interior of the blade. The resultant low pressure area at the blade tip sucks the surrounding air into the blade encouraging the formation of a vortex 131 which in turn forces air to the extremities of the blade resulting in additional rotational force on the rotor.

In some embodiments the ratio of open space in the center of the turbine to the area occupied by the rotor blades is between 1:5 and 1:7 and in one embodiment is approximately 1:6.

While example embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A vertical axis fluid turbine comprising: a rotor assembly having at least two rotor blades, each rotor blade in said rotor assembly comprising: a segment of a spherical surface residing on a datum sphere, having a first end proximal to the top of the rotor blade, and a second end proximal to the bottom of the rotor blade; and a curved surface extending between said first end and said second end, having a concave side and a convex side, a vertical edge; and a vertical central axis parallel to the vertical edge, extending through a center of said datum sphere, and through the center of said rotor assembly; and an empty space extending between said first end and said second end and proximal to said vertical central axis and proximal to said vertical edge of said curved surface; and an array of holes in said segment of the spherical surface second end, proximal to the bottom of the rotor blade; wherein fluid flowing over one of said at least two rotor blades exerts a force on said curved surface concave side, flows without obstruction through said empty space between said first end and said second end and proximal to said vertical central axis and then flows over, and exerts a force on, a second of said at least two rotor blades curved surface concave side, as the fluid exits the rotor assembly; while updraft fluid flow passes through said array of holes, causing a vortex that in turn exerts a force on said curved surface concave side of each of said at least two rotor blades, wherein: each rotor blade in said rotor assembly further comprises: a deflector surface offset from, and joined to, said segment of the spherical surface second end, and proximal to said array of holes; wherein fluid moves through said array of holes, is deflected by said deflector surface, resulting in a relatively higher pressure proximal to the holes and a relatively lower pressure in the area of the blade above said deflector surface, drawing fluid flow from said relatively higher pressure to said relatively lower pressure forming a vortex which results in a force on said concave side of said curved surface of each said rotor blade in said rotor assembly.

2. The vertical axis fluid turbine of claim 1, wherein the deflector surface is offset from said segment of the spherical surface second end by a ratio that is between 1/14 and 1/36 of the overall height of the rotor blade.

3. The vertical axis fluid turbine of claim 1, wherein the deflector surface further comprises: a root proximal to said vertical central axis, and a tip relatively further from said vertical central axis; wherein the offset distance between the tip and said segment of the spherical surface second end is smaller than the offset distance between the root and said segment of the spherical surface second end.

* * * * *